United States Patent [19]

Inaba

[11] Patent Number: 4,487,491
[45] Date of Patent: Dec. 11, 1984

[54] FILM PRESSURE PLATE

[75] Inventor: Shozi Inaba, Tokyo, Japan

[73] Assignee: Fuji Photo Film Co., Ltd., Kanagawa, Japan

[21] Appl. No.: 486,303

[22] Filed: Apr. 19, 1983

[30] Foreign Application Priority Data

Apr. 28, 1982 [JP] Japan ............... 57-61305[U]

[51] Int. Cl.$^3$ ............................................. G03B 17/00
[52] U.S. Cl. ..................................... 354/203; 352/221
[58] Field of Search ............... 354/203, 288; 352/224, 352/221, 227

[56] References Cited

U.S. PATENT DOCUMENTS

| 1,817,965 | 8/1931 | Christie | 354/203 |
| 2,057,553 | 10/1936 | Boecking | 352/227 |
| 3,282,181 | 11/1966 | Lange | 354/203 |
| 3,550,512 | 12/1970 | Lange | 354/203 |

Primary Examiner—A. A. Mathews
Attorney, Agent, or Firm—Young & Thompson

[57] ABSTRACT

A film pressure plate comprising a plate having a large number of projections with their tops smoothly curved, to press the film without scratching it to hold it flat in the focal plane of the camera. The plate has leaf springs to press it against the film and is integrally molded of plastic.

3 Claims, 2 Drawing Figures

FILM PRESSURE PLATE

BACKGROUND OF THE INVENTION

The present invention relates to a film pressure plate on a camera back cover to press photographic film tightly against film guides, thereby holding the film flat in the focal plane.

To produce an image accurately formed on photographic film, it is essential to hold the film with its surface perpendicular to the optical axis and to position it within the depth of focus. For the purpose of holding the film flat in the focal plane, a pressure plate of metal such as aluminum or the like is attached to the camera back cover by means of leaf springs of stainless steel so as to press the film against guide rails upon closing the camera back cover.

Film pressure plates conventionally employed have a surface against the film, wherein an extremely large number of minute shallow indentations are provided at equal spaces so as to avoid close adhesion to the film. However, such film pressure plates gradually become loaded with dust from the exterior, and sticky residues rub off the film while using the camera at frequent intervals, with the result that the pressure plate can no longer fulfil its intended function and the film is caused to travel poorly owing to the close adhesion to the film. Furthermore, the dust and residues, if they accumulate sufficiently in the indentations so as to become solid, scratch the film surface.

SUMMARY OF THE INVENTION

It is, accordingly, the principal object of the present invention to provide a film pressure plate wherein there is almost no adhesion thereto of dust or residues that have rubbed off the film emulsion layer and the like.

Another object of the present invention is to provide a film pressure plate which does not scratch a film in close contact therewith and is adapted to prevent a film from sticking thereto.

Still another object of the present invention is to provide a film pressure plate which is light in weight and can be manufactured at low cost.

These objects are accomplished by a film pressure plate according to the present invention, over the whole surface of which are uniformly distributed a large number of minute projections adapted to bear against the back surface of the film. In a preferred embodiment of the present invention, a pressure plate with a large number of minute projections is of plastic and is integrally provided with leaf springs, resulting in a low manufacturing cost and a camera of a light weight. It is also preferred that the surfaces of the projections that contact the film be smoothly rounded.

The above and other objects and features of the present invention will become more apparent from the following description of a preferred embodiment of the present invention taken in conjunction with the accompanying drawing.

DETAILED DESCRIPTION OF THE INVENTION

Figure 1:
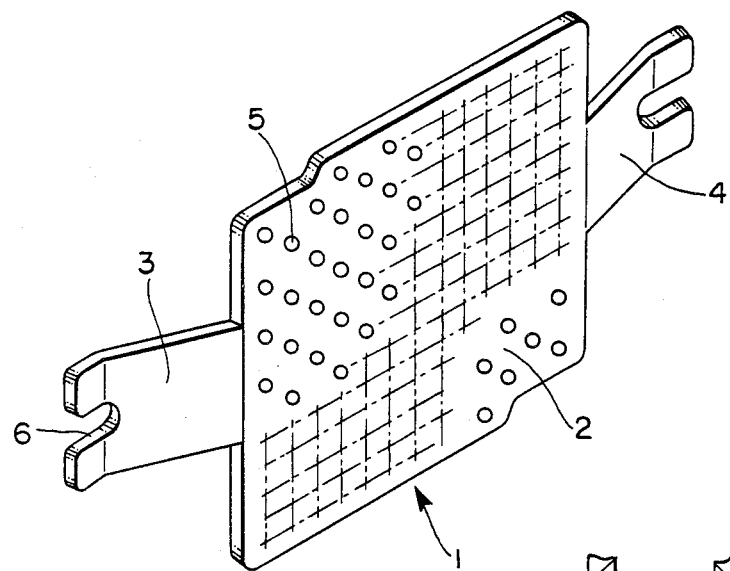
FIG. 1 is a perspective view illustrating a film pressure plate in accordance with the present invention.

As shown in FIG. 1, a film pressure plate 1 comprises a rectangular plate 2 slightly larger than a picture format and a pair of leaf springs 3 provided on both sides and inclined backward. Although the film pressure plate 1 can be made of metal, plastic or the like, it is desirable to use plastic because the use of plastic easily permits integrally molding the plate 2 with a sufficient thickness to be resistant to deformation and the leaf springs 3 and 4 which are made thinner than the plate 2 so as to have sufficient resilience, resulting in a low manufacturing cost and a camera of a light weight.

Formed on a surface of the plate 2 are a large number of minute projections 5 having equal height, for instance hemispheres, at equal spacing from each other, and which have smoothly rounded top surfaces so as to touch the film without scratching it. The total area of the projections 5 is substantially less than half the area of plate 2 from which they arise. Each of said leaf springs 3 and 4 is formed with an aperture 6 into which a stud 8 on the camera back cover is fitted.

Figure 2:
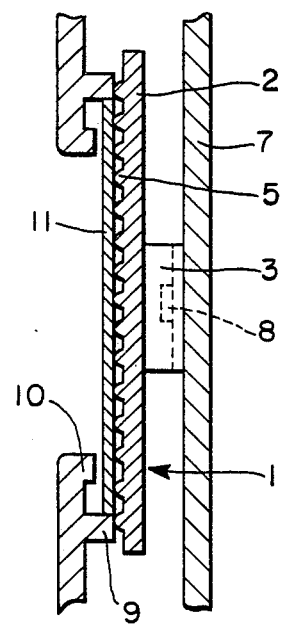
FIG. 2 is a cross sectional view illustrating the film pressure plate incorporated in a camera.

FIG. 2 shows the film pressure plate 1 in a camera. The film pressure plate 1 is attached to a camera back cover 7 through the leaf springs 3 and 4 with their apertures 6 engaged with studs 8. The film pressure plate 1 secured to the camera back cover 7 abuts a pair of outer rails 9 forming a part of the camera and providing film guide tunnels between the pair of outer rails and a pair of inner film guide rails 10. A film 11 with side margins in the film guide tunnels is pressed tightly against the film guide rails 10 by the spring loaded pressure plate 1 so as to hold the film 11 flat in the focal plane to eliminate looseness of the film and to provide good resolution. Furthermore, the projections 5 on the plate 2 can prevent the film 11 from adhering to the plate 2 so as to ensure smooth travel of the film 11. When foreign substances such as dust or residues that have rubbed off the film 11 and the like get into the spaces between projections, they are released easily without being accumulated. Even if foreign substances attach themselves to the plate 2 of the film pressure plate 1, the projections 5 prevent these foreign substances from attaching themselves to the film, at the same time ensuring that the film is not scratched.

While a preferred embodiment has been illustrated and described, many other variations may be made in the particular design and configuration of the device of the invention without departing from the scope of the invention as set forth in the appended claims.

What is claimed is:

1. A film pressure plate for holding a film flat in the focal plane of a camera, comprising a plate member having a flat surface adapted to confront said film, a large number of projections formed on said flat surface and adapted to touch a said film, and leaf springs disposed at opposite sides of said plate member and tilted backward away from each other in directions away from said surface.

2. A film pressure plate as defined in claim 1, said leaf springs having slots therein at their ends remote from said surface for the reception of studs on the back cover of a camera.

3. In combination with a camera having a back cover, a film pressure plate for holding a film flat in the focal plane of the camera, said plate comprising a plate member having a flat surface adapted to confront a film and disposed on the side of said plate member which is opposite said cover, a large number of projections formed on said flat surface and adapted to touch said film and extending forwardly from said flat surface in a direction away from said back cover, leaf springs on opposite sides of said plate member inclined backwardly in opposite directions from each other away from said plate member and contacting said back cover, said leaf springs having slots in their ends remote from said plate member, and studs on said back cover disposed in said slots.

* * * * *